United States Patent
Loh

(10) Patent No.: US 10,181,061 B2
(45) Date of Patent: Jan. 15, 2019

(54) SYSTEMS, METHODS AND DEVICES FOR CONCEALED EMV CHIP CARD READERS

(71) Applicant: VeriFone, Inc., San Jose, CA (US)

(72) Inventor: Yang Hock Jeffrey Loh, Singapore (SG)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 15/592,563

(22) Filed: May 11, 2017

(65) Prior Publication Data
US 2018/0330130 A1    Nov. 15, 2018

(51) Int. Cl.
*G06K 7/00*    (2006.01)
*G07F 7/08*    (2006.01)
*G07F 19/00*    (2006.01)

(52) U.S. Cl.
CPC .......... *G06K 7/0078* (2013.01); *G07F 7/082* (2013.01); *G07F 7/084* (2013.01); *G07F 7/0873* (2013.01); *G07F 19/2055* (2013.01)

(58) Field of Classification Search
CPC ...... G06K 7/0004; G06K 7/084; G06K 13/08; G06K 7/0021; G06K 13/06; G06K 19/07345; G06K 19/07381; G06K 2017/0067; G06K 7/00; G06K 7/0026; G06K 7/0043; G06K 7/082; G07F 19/20; G07F 19/201

(Continued)

(56) References Cited

U.S. PATENT DOCUMENTS

| 5,334,827 A | 8/1994 | Bleier |
| 5,434,404 A * | 7/1995 | Liu .................. G06K 7/084 |
| | | 235/384 |

(Continued)

FOREIGN PATENT DOCUMENTS

| DE | 3916783 | 4/1990 |
| FR | 2792437 | 10/2000 |

(Continued)

OTHER PUBLICATIONS

Notice of Allowance dated Jul. 20, 2016, which issued during the prosecution of U.S. Appl. No. 14/580,995.

(Continued)

*Primary Examiner* — Thien M Le
(74) *Attorney, Agent, or Firm* — Hunton Andrews Kurth LLP

(57) ABSTRACT

Systems, methods, and devices for concealed chip-card readers are disclosed. In one embodiment, a chip-enabled card reader may include a card slot that receives a chip-enabled card; a carriage comprising a smart chip connector for contacting a chip on the chip-enabled card; and at least one carriage track disposed within the chassis that slideably engages the carriage and defines a path of movement for the carriage between a protected position and a reading position. The carriage may move along the path of movement to a reading position. The smart chip connector may contact the chip on the chip-enabled card when the chip-enabled card is in a fully-inserted position. The carriage is in the protected position when no card has been inserted into the card slot. In one embodiment, the smart chip connector has reduced accessibility through the opening.

20 Claims, 7 Drawing Sheets

(58) Field of Classification Search
USPC .......................................................... 235/439
See application file for complete search history.

(56) References Cited

U.S. PATENT DOCUMENTS

| | | | |
|---|---|---|---|
| 5,929,427 A | 7/1999 | Harada | |
| 5,984,184 A | 11/1999 | Kojima | |
| 6,021,948 A * | 2/2000 | Tsai | G06K 7/0004 235/440 |
| 6,109,522 A * | 8/2000 | Force | B65H 3/047 235/379 |
| 6,179,638 B1 | 1/2001 | Lim | |
| 6,267,295 B1 | 7/2001 | Amagai | |
| 6,435,887 B2 | 8/2002 | Koitsalu | |
| 6,496,381 B1 | 12/2002 | Groeger | |
| 6,508,673 B2 | 1/2003 | McDowell | |
| 7,234,970 B2 | 6/2007 | Valcher et al. | |
| 8,333,521 B2 | 12/2012 | Viglione | |
| 8,474,700 B1 * | 7/2013 | Lewis | G06Q 10/00 235/379 |
| 8,544,743 B2 | 10/2013 | Hong et al. | |
| 9,038,891 B2 | 5/2015 | Lewis | |
| 9,715,603 B1 | 7/2017 | Faoro | |
| 2002/0088857 A1 * | 7/2002 | Bricaud | G06K 7/0021 235/451 |
| 2005/0211779 A1 * | 9/2005 | Ishii | G06K 7/0021 235/441 |
| 2006/0289643 A1 | 12/2006 | Hopt et al. | |
| 2007/0095910 A1 | 5/2007 | Gallagher et al. | |
| 2008/0121706 A1 | 5/2008 | Defibaugh et al. | |
| 2008/0164320 A1 | 7/2008 | Garrido-Gadea et al. | |
| 2009/0042433 A1 | 2/2009 | Bushby | |
| 2009/0090778 A1 | 4/2009 | Maiterth | |
| 2013/0026218 A1 * | 1/2013 | Miller | G06K 7/0004 235/375 |
| 2013/0119136 A1 | 5/2013 | Ishikawa | |
| 2013/0298252 A1 | 11/2013 | Ribeiro-Pereira | |
| 2013/0316556 A1 | 11/2013 | Bertsch | |
| 2014/0217169 A1 * | 8/2014 | Lewis | G07F 19/201 235/379 |
| 2015/0287289 A1 * | 10/2015 | Lewis | G07F 19/201 235/379 |
| 2016/0267299 A1 | 9/2016 | Yanko | |

FOREIGN PATENT DOCUMENTS

| | | |
|---|---|---|
| GB | 2319104 | 5/1998 |
| WO | WO 2005/114544 | 12/2005 |
| WO | WO 2016/042543 | 3/2016 |

OTHER PUBLICATIONS

U.S. Appl. No. 62/050,866, filed Sep. 16, 2014.
International Search Report and Written Opinion dated Dec. 21, 2015, issued during prosecution of Applicant's PCT/IL2015/050851.
Office Action dated Jul. 15, 2016, which issued during the prosecution of U.S. Appl. No. 15/098,629.
European Communication and Extended European Search Report, European Patent Application No. 17173858.6, Oct. 12, 2017, pp. 1-9.
European Communication and Partial European Search Report, European Patent Application No. 17173857.8, Oct. 11, 2017, pp. 1-9.

* cited by examiner

SYSTEMS, METHODS AND DEVICES FOR CONCEALED EMV CHIP CARD READERS

BACKGROUND OF THE INVENTION

1. Field of the Invention

The present disclosure relates generally to transaction card reading devices, and, more particularly, to systems, methods, and devices for concealed EMV chip card readers.

2. Description of the Related Art

EMV-enabled chip card readers are often the targets of skimming attacks. Attackers may attempt to access one or more chip reading contacts within a card reader in order to access chip data from a chip card when it is inserted. To this end, some card reading devices have chip readers that retract when a card is not inserted, and are raised when a card is inserted. Even in the retracted state, however, the chip reader contacts are still exposed and accessible through the card opening slot.

These and other deficiencies exist.

SUMMARY OF THE INVENTION

Systems, methods, and devices for concealed EMV chip card readers are disclosed. In one embodiment, a chip-enabled card reader may include a card slot that receives a chip-enabled card; a carriage comprising a smart chip connector for contacting a chip on the chip-enabled card and a latch that engages an edge of the chip-enabled card in the card slot; at least one carriage track disposed within the chassis that slideably engages the carriage and defines a path of movement for the carriage between a protected position and a reading position; and at least one biasing element that biases the carriage in the protected position. The carriage may move along the path of movement to a reading position in response to the chip-enabled card engaging the latch and being inserted into the card slot. The smart chip connector contacts the chip on the chip-enabled card when the chip-enabled card is in a fully-inserted position.

In one embodiment, the smart chip connector may have reduced accessibility through the opening when the chassis is in the protected position.

In one embodiment, the carriage may also include a plurality of guides that engage the carriage track.

In one embodiment, the card reader may also include a printed circuit board and/or a tamper mesh, and the smart chip connector may be positioned behind the printed circuit board or the tamper mesh when in the protected position.

In one embodiment, the biasing element may include at least one spring.

In one embodiment, the card slot may be provided at an angle to a front of the card reader.

According to another embodiment, a chip-enabled card reader may include a card slot that receives a chip-enabled card; a carriage comprising a smart chip connector for contacting a chip on the chip-enabled card; a sensor that detects when the chip-enabled card is in a fully-inserted position; at least one carriage track disposed within the chassis that slideably engages the carriage and defines a path of movement for the carriage between a protected position and a reading position; and a motor that moves the carriage between the protected position and the reading position in response to the detecting that the chip-enabled card is in the fully-inserted position.

In one embodiment, the motor may move the carriage between the reading position and the protected position in response to the detecting that the chip-enabled card is in the fully-inserted position.

In one embodiment, the smart chip connector has reduced accessibility through the opening when the chassis is in the protected position.

In one embodiment, the carriage may also include a plurality of guides that engage the carriage track.

In one embodiment, the card reader may also include a printed circuit board and/or a tamper mesh, and the smart chip connector may be positioned behind the printed circuit board or the tamper mesh when in the protected position.

In one embodiment, the card slot may be provided at an angle to a front of the card reader.

According to another embodiment, a chip-enabled card reader may include a card slot that receives a chip-enabled card; a carriage comprising a smart chip connector for contacting a chip on the chip-enabled card; and at least one carriage track disposed within the chassis that slideably engages the carriage and defines a path of movement for the carriage between a protected position and a reading position. The carriage may move along the path of movement to a reading position. The smart chip connector may contact the chip on the chip-enabled card when the chip-enabled card is in a fully-inserted position. The carriage is in the protected position when no card has been inserted into the card slot.

In one embodiment, the smart chip connector has reduced accessibility through the opening.

In one embodiment, the card reader may also include at least one biasing element that biases the carriage in the protected position.

In one embodiment, the carriage may further include a latch that engages an edge of the chip-enabled card in the card slot.

In one embodiment, the carriage moves along the path of movement in response to the chip-enabled card engaging the latch.

In one embodiment, the card reader may also include a motor that moves the carriage between the protected position and the reading position. The motor may move the carriage in response to the detecting that the chip-enabled card is in the fully-inserted position.

In one embodiment, the card reader may also include a bottom guide block and a top guide block, and the card slot may be defined by the bottom guide block and the top guide block.

In one embodiment, the bottom guide block may include an opening for debris to pass through.

In one embodiment, the card reader may include a shutter at an opening of the card slot, wherein the shutter open in response to a presence of the chip-enabled card, and closes in response to an absence of the chip-enabled card.

In one embodiment, the card reader may also include a printed circuit board and/or a tamper mesh, and the smart chip connector may be positioned behind the printed circuit board or the tamper mesh when in the protected position.

In one embodiment, the card reader may further include an electrostatic discharge device.

According to another embodiment, a card reader may include a bottom guide block and a top guide block defining a card slot receiving a chip-enabled card; a carriage comprising a smart chip connector for contacting a chip on the chip-enabled card, a latch that engages an edge of the chip-enabled card in the card slot, and a plurality of guides; at least one track disposed within the chassis that slideably engages the carriage using the plurality of guides and provides a path of movement for the carriage between a protected position and a reading position; and at least one spring that biases the carriage in the protected position. The carriage may move along the path of movement to a reading position in response to the chip-enabled card engaging the latch and being inserted into the card slot. The smart chip connector may contact the chip on the chip-enabled card when the chip-enabled card is in a fully-inserted position.

In one embodiment, the smart chip connector may have reduced accessibility through the opening when the chassis is in the protected position.

In one embodiment, the card reader may also include a shutter at an opening of the card slot, and the shutter open in response to a presence of the chip-enabled card, and closes in response to an absence of the chip-enabled card.

In one embodiment, the card reader may further include an electrostatic discharge device.

In one embodiment, the bottom guide block may include at least one opening for debris to pass through.

In one embodiment, the card slot may be provided at an angle to a front of the card reader.

In one embodiment, the card reader may also include a printed circuit board and/or a tamper mesh, and the smart chip connector may be positioned behind the printed circuit board or the tamper mesh when in the protected position.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any manner within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Several embodiments of the present invention and their advantages may be understood by referring to FIGS. 1-7.

Figure 1:
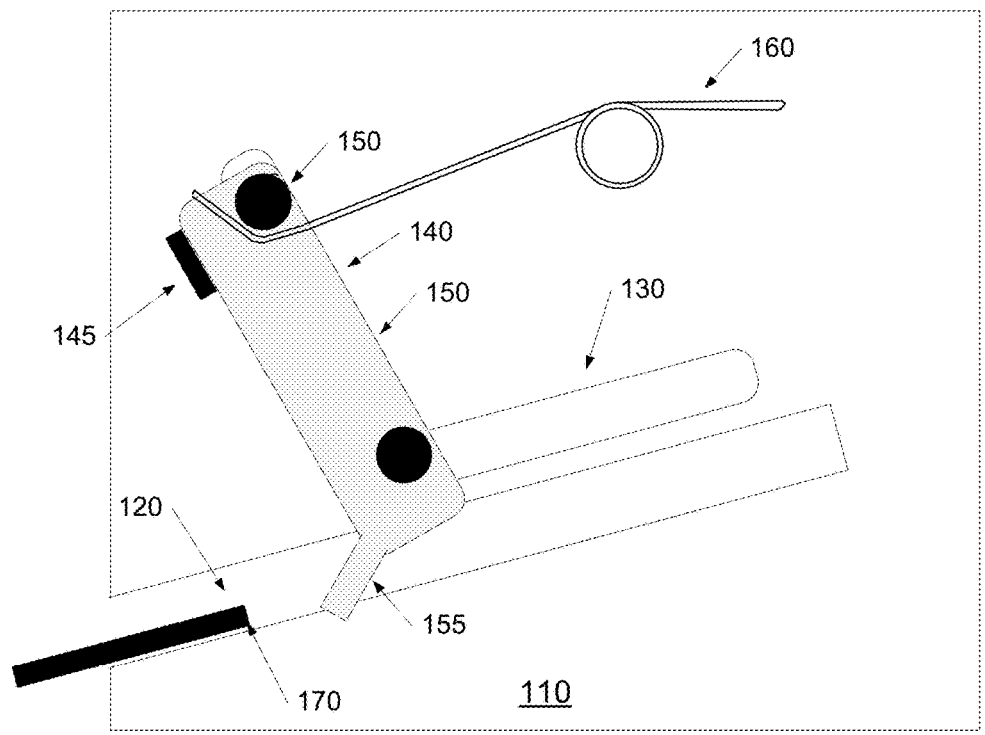
FIG. 1 depicts a card reader according to one embodiment with a carriage in a first position.

Referring to FIG. 1, a block diagram of card reader 100 is provided according to one embodiment. In one embodiment, card reader 100 may include chassis 110 that may include card slot 120, one or more track 130, carriage 140 that may include smart chip connector 145, guides 150, and latch 155, and biasing element 160. Guides 150 may be positioned within track 130 so that carriage 140 may slideably move along a path of movement defined by tracks 130. As carriage 140 moves along track 130, smart chip connector 145 rotates as well. In one embodiment, when inserted, an edge of card 170 engages with latch 155 and pushes on carriage 140, thereby moving carriage 140 along tracks 130. In one embodiment, a motor (not shown) may provide assistance in receiving the card and/or in moving carriage 140.

In one embodiment, one or more biasing elements 160, such as a spring, a motor and drive mechanism, etc. may be provided and may bias carriage 140 in a protected position when card 170 is not inserted.

In one embodiment, chassis 110 may be part of a point of sale device, an automated teller machine, a kiosk, gas pump, or any other suitable device that may receive a chip card.

Card slot 120 is illustrated as being positioned at an upward angle, so as to reduce the intake of debris, dirt, water, and other foreign matter into the opening of card slot 120. It should be recognized that card slot 120 may be positioned at any suitable angle (e.g., parallel to ground, downward, etc.) as is necessary and/or desired.

Figure 2:
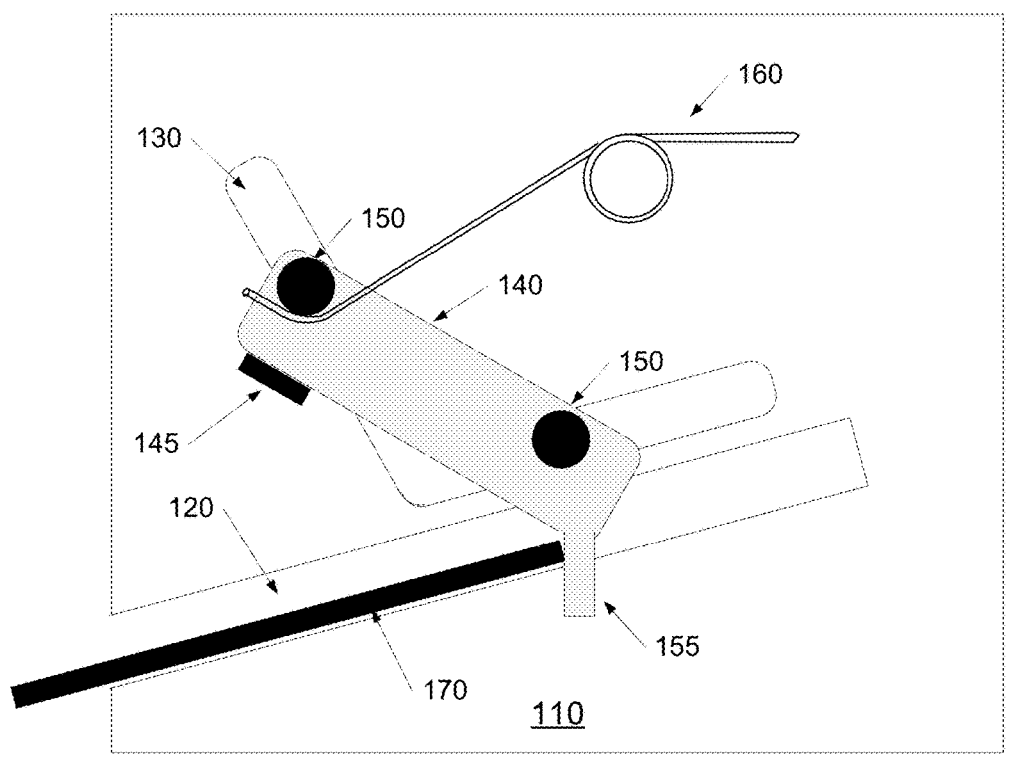
FIG. 2 depicts the card reader of FIG. 1 with a carriage in a second position.

Referring to FIG. 2, a diagram of card reader 100 with carriage 140 in a first, or protected, position is illustrated according to one embodiment. In FIG. 2, card 170 is either absent or has not been inserted to engage latch 155 of carriage 140. One or more biasing element 160 biases carriage 140 in a protected position, so that smart chip connector 145 is not present in the card slot and therefore protected. In the protected position, smart chip connector 145 is positioned to provide limited or no line of sight between the opening in card slot 120 of chassis 110 and smart chip connector 145, thereby reducing or eliminating the effectiveness of using tools to access smart chip connector 145.

In one embodiment, smart chip connector 145 may be further protected from tampering attempts, such as by placing or moving carriage 140 and smart chip connector 145 behind a printed circuit board (not shown), a tamper mesh (not shown), a display (not shown), other material (not shown), etc., and/or made further inaccessible or having reduced accessibility via the opening in card slot 120. Additional protection for smart chip connector 145 may be provided as is necessary and/or desired.

Figure 3:
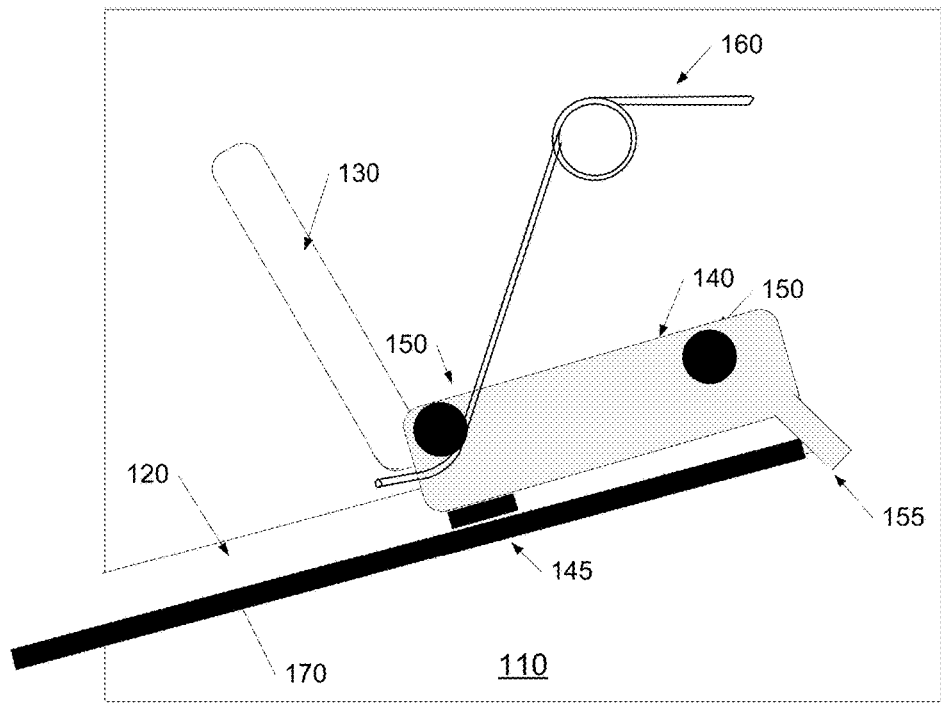
FIG. 3 depicts the card reader of FIG. 1 with a carriage in a third position.

Referring to FIG. 3, a diagram of card reader 100 with carriage 140 in a second, or transition, position is illustrated according to one embodiment. In FIG. 3, card 170 has been partially inserted into the card reader to a point where it has engaged latch 155 of carriage 140, which causes carriage 140 to move along track 130. In one embodiment, smart chip connector 145 may not contact card 170 until card 170 is fully seated. The exact path for carriage 140, and the point at which smart chip connector 145 contacts card 170 may be determined by the design of track 130, the design of carriage 140 and latch 155, or both.

In one embodiment, a motor (not shown) driving a roller (not shown) may assist in the insertion and/or removal of card 170.

Referring to FIG. 3, a diagram of chassis 110 with carriage 140 in a third, or reading, position is illustrated according to one embodiment. In FIG. 3, card 170 is fully seated. In one embodiment, a portion of card 170 may remain outside card reader 100. When card 170 is fully seated, smart chip connector 145 makes contact with smart chip (not shown) on card 170 such that data can be transferred between the card reader and card 170.

When card 170 is removed, the process is reversed, and one or more biasing elements 160 causes carriage 140 to return to the protected position.

Figure 4:
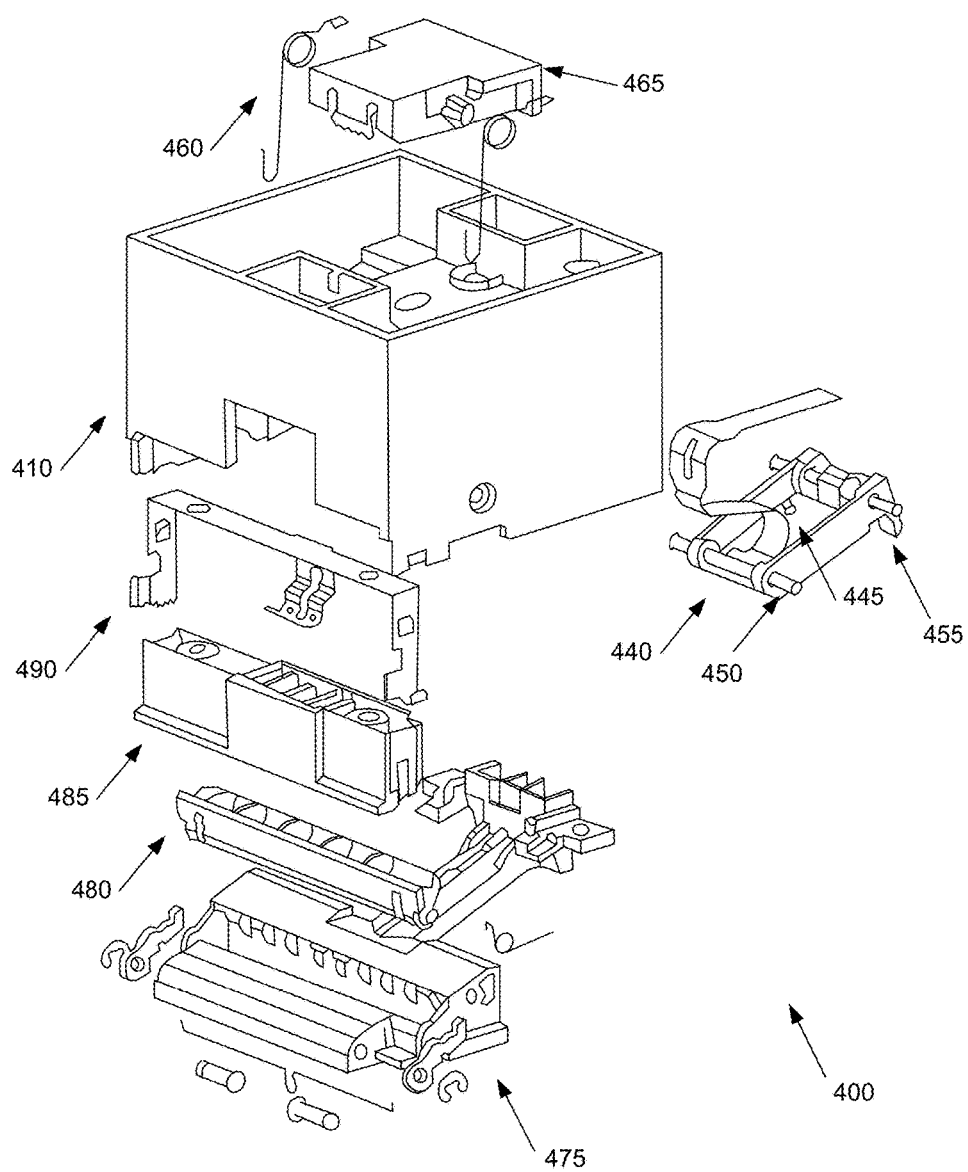
FIG. 4 depicts an expanded view of a card reader according to one embodiment.

Referring to FIG. 4, an expanded view of an exemplary embodiment of a card reader is provided. It should be noted that this embodiment is exemplary only, and that other elements and positioning of elements may be included as is necessary and/or desired.

In one embodiment, card reader 400 may include chassis 410 that may include bottom guide block 475, shutter 480, top guide block 485, electrostatic discharge (ESD) device 490, carriage 440 having smart chip connector 445, latch 455, and one or more guides 450.

In one embodiment, shutter 480 may open and close in response to the presence or absence of a card (not shown). In one embodiment, shutter 480 may act as a first line of defense and may reduce the intentional or unintentional insertion of unintended foreign objects.

In one embodiment, top guide block 485 may house electrostatic discharge (ESD) device 490. ESD device 490 may provide ESD protection from any stray static discharges from inserted card before it can reach smart chip connector 445.

An example of ESD device 490 may be found in U.S. Pat. No. 8,544,743, the disclosure of which is hereby incorporated, by reference, in its entirety.

In one embodiment, carrier 440 may further include a plurality of guides 450 that permit carrier 440 to slideably move along tracks or rails (not shown). As carrier 440 moves along the track or rails, smart chip connector 445 rotates as well. In one embodiment, when inserted, a edge of a card (not shown) engages with latch 455 and may push on carriage 440. In one embodiment, a motor (not shown) may provide assistance in receiving the card and/or in moving carriage 440.

In one embodiment, a reed switch (not shown) may be provided on the rear face of carrier 440 and may be activated, for example, by a magnet (not shown) when the card is fully inserted or seated. In one embodiment, this may generate a signal that informs a controller (not shown) that the card is inserted and may be read.

In one embodiment, one or more biasing element 460, such as a spring, and biasing element holder 465 may be provided to bias carriage 440 in a first, or protected, position. In one embodiment, biasing element 460 may comprise a motor and a drive mechanism (not shown).

Chassis 410 may provide a housing for the above-mentioned elements, and may be arranged to receive a transaction card, such as a chip-enabled card.

In one embodiment, additional security may be provided on one or more sides or areas of chassis 410 by a meshed printed circuit board assembly (not shown), a display screen (not shown), additional materials (e.g., metal, etc.), etc.

In one embodiment, bottom guide block 475, shutter 480, and top guide block 485 may define a slot or opening for receiving the transaction card. In one embodiment, bottom guide block 475, shutter 480, and top guide block 485 may be positioned so that a card is inserted at an angle (e.g., an upward angle) so as to reduce the intake of debris, dirt, water, etc. In another embodiment, bottom guide block 475, shutter 480, and top guide block 485 may be positioned so that the card is inserted normal to the front of the card reader.

Similarly, bottom guide block 475 may be provided with one or more openings so that debris and other foreign material may fall out of the card path.

Figure 5:
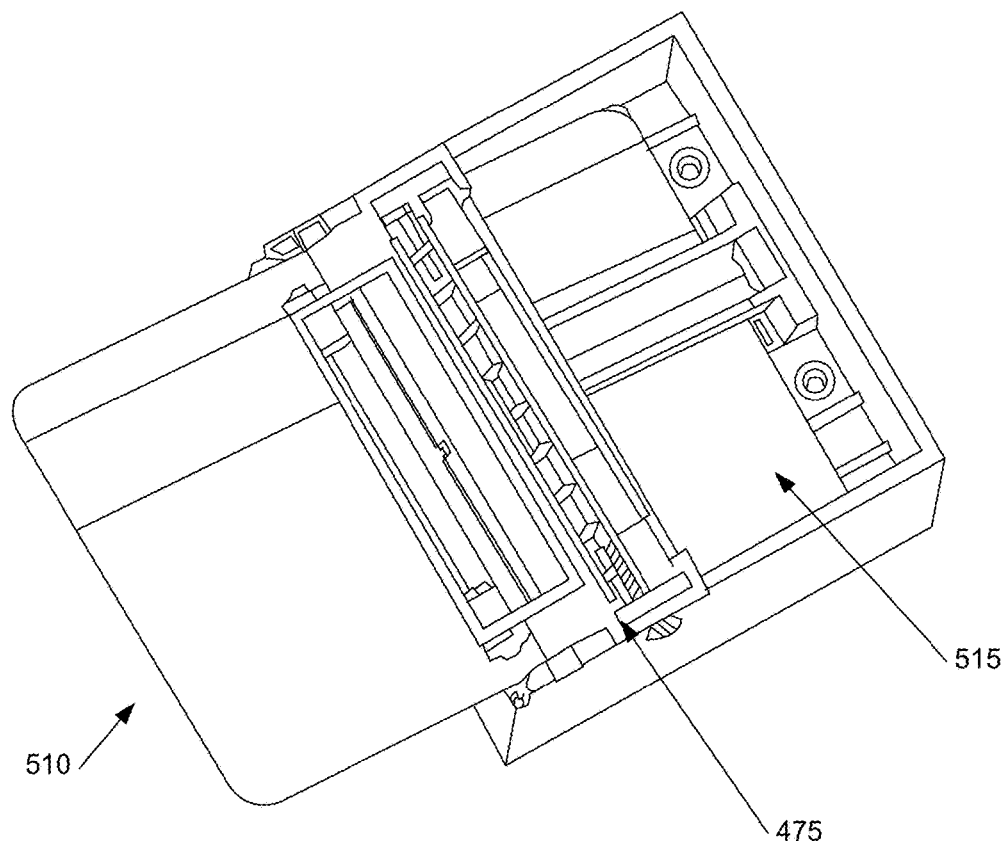
FIG. 5 depicts a bottom view of a bottom guide block according to one embodiment.

Referring to FIG. 5, an illustration of a bottom view of a bottom guide block 475 is provided according to one embodiment. Bottom guide block 475 may provide support to the inserted card 510 opposite to the smart chip connector (not shown). In one embodiment, one or more opening 515 may be provided so that any foreign object or debris inserted into the slot will generally fall out of the insertion path.

Figure 6:
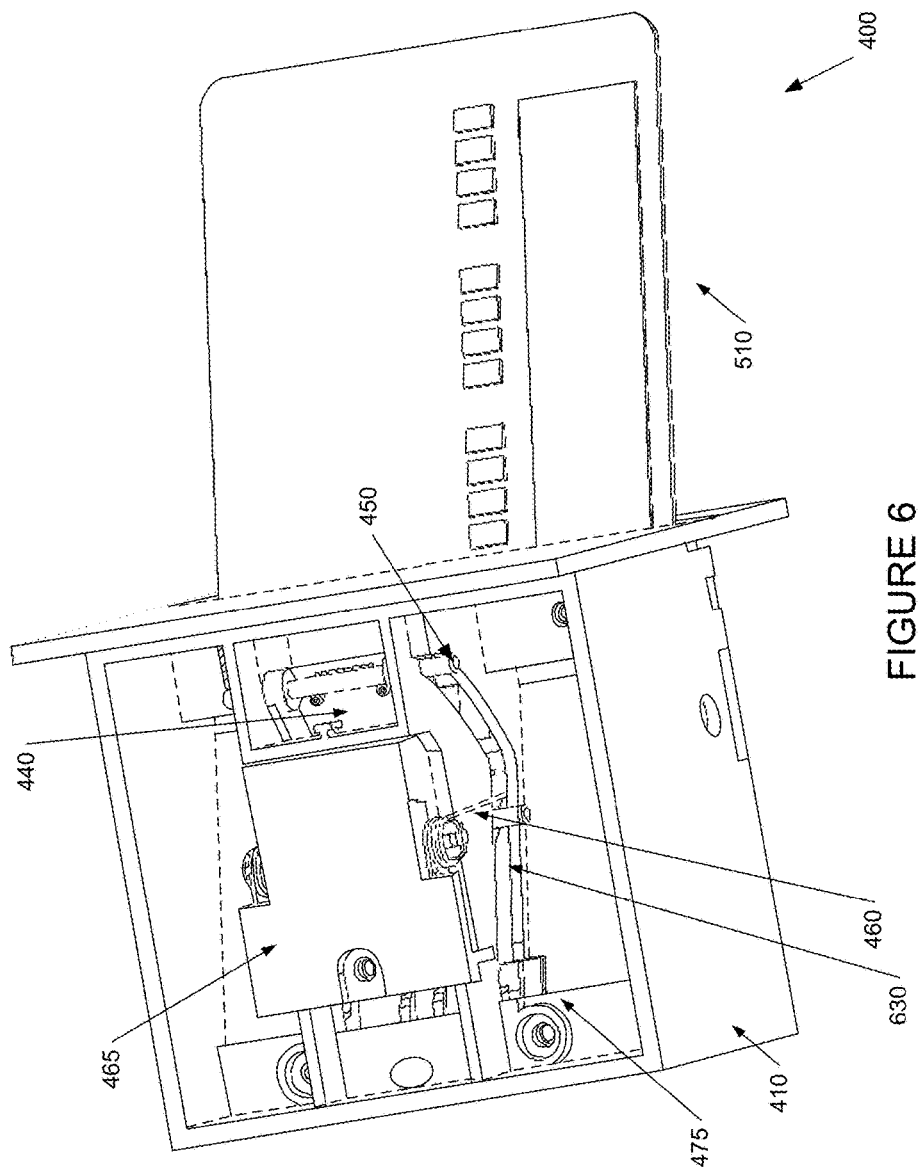
FIG. 6 depicts a perspective view of the card reader of FIG. 4.

Referring to FIG. 6, a perspective view of card reader 400 is provided according to one embodiment. In one embodiment, one or more tracks or rails 630 may be provided to interact with carriage 440 to provide a path of movement for carriage 440 in response to the insertion or removal of card 510. Any suitable mechanism that provides a path for carriage 440 may be used as is necessary and/or desired. In one embodiment, biasing elements 460 may bias carriage 440 in a protected position when card 510 is not inserted.

Figure 7:
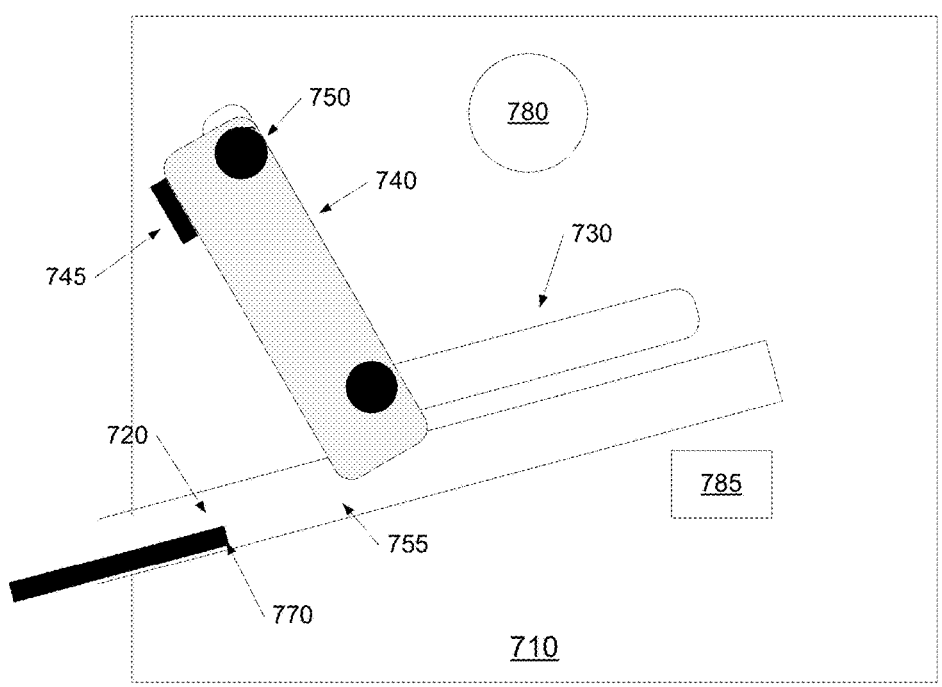
FIG. 7 depicts a card reader according to another embodiment.

Referring to FIG. 7, a block diagram of card reader 700 is provided according to one embodiment. In one embodiment, card reader 700 may include chassis 710 that may include card slot 720, one or more tracks 730, carriage 740 that may include smart chip connector 145 and guides 750, motor and drive system 780, and one or more sensors 785. Guides 750 may be positioned within track 730 so that carriage 740 may slideably move along a path of movement defined by tracks 730. Similar to the disclosure of FIGS. 1-3, as carriage 740 moves along track 730, smart chip connector 745 rotates as well.

In one embodiment, carriage 740 and smart chip connector 745 may not be positioned with the card slot until after the card reader identifies that a card has been fully inserted and seated into the card slot. Once that has been determined by, for example, sensor 785, which may include one or more optical switches, micro switches, etc., carriage 740 and smart chip connector 745 may be positioned in card slot 720 to make contact with card 770 by any suitable mechanism, including for example, with the use of a motor and drive system that cause the carriage 740 to move into card slot 720 such that smart chip connector 745 is functionally engaged with the chip of card 770. Similarly, upon the card being disengaged from the fully inserted and seated position, the motor and drive system will cause carriage 740 to move out of card slot 770 and back into the first, or protected, position.

In another embodiment, motor and drive system 780 may cause carriage 740 to move back to the first, or protected, position in response to the receipt of a signal indicating that the transaction has been completed, that the data has been read, etc.

In one embodiment, chassis 710 may be part of a point of sale device, an automated teller machine, a kiosk, gas pump, or any other suitable device that may receive a chip card.

Card slot 720 is illustrated as being positioned at an upward angle, so as to reduce the intake of debris, dirt, water, and other foreign matter into the opening of card slot 720. It should be recognized that card slot 720 may be positioned at any suitable angle (e.g., parallel to ground, downward, etc.) as is necessary and/or desired.

Although multiple embodiments are disclosed, it should be recognized that these embodiments are not exclusive to one another, and features of one embodiment may be applied to the others as is necessary and/or desired.

It will be appreciated by those skilled in the art that the various embodiments are not limited by what has been particularly shown and described hereinabove. Rather the scope of the various embodiments includes both combinations and sub-combinations of features described hereinabove and variations and modifications thereof which are not in the prior art. It should further be recognized that these various embodiments are not exclusive to each other.

It will be readily understood by those persons skilled in the art that the embodiments disclosed here are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the above description.

Accordingly, while the various embodiments have been described here in detail in relation to exemplary embodiments, it is to be understood that this disclosure is only illustrative and exemplary and is made to provide an enabling disclosure. Accordingly, the foregoing disclosure is not intended to be construed or to limit the various embodiments or otherwise to exclude any other such embodiments, adaptations, variations, modifications or equivalent arrangements.

What is claimed is:

1. A chip-enabled card reader, comprising:
   a card slot that receives a chip-enabled card;
   a carriage comprising a smart chip connector for contacting a chip on the chip-enabled card and a latch that engages an edge of the chip-enabled card in the card slot;
   at least one carriage track disposed within the chassis that slideably engages the carriage and defines a path of movement for the carriage between a protected position and a reading position; and
   at least one biasing element that biases the carriage in the protected position;
   wherein the chip-enabled card engages the latch on the carriage and insertion of the chip-enabled card into the card slot moves the carriage along the path of movement to a reading position, wherein the smart chip connector contacts the chip on the chip-enabled card when the chip-enabled card is in a fully-inserted position.

2. The card reader of claim 1, wherein the carriage further comprises a plurality of guides that engage the carriage track.

3. The card reader of claim 1, wherein the card reader further comprises at least one of a printed circuit board and a tamper mesh, wherein the smart chip connector is positioned behind the printed circuit board or the tamper mesh when in the protected position.

4. The card reader of claim 1, wherein the biasing element comprises at least one spring.

5. The card reader of claim 1, wherein the card slot is provided at an angle to a front of the card reader.

6. A chip-enabled card reader, comprising:
   a card slot that receives a chip-enabled card;
   a carriage comprising a smart chip connector for contacting a chip on the chip-enabled card;
   a sensor that detects when the chip-enabled card is in a fully-inserted position;
   at least one carriage track disposed within the chassis that slideably engages the carriage and defines a path of movement for the carriage between a protected position and a reading position, wherein the path of movement is in a substantially same direction as a direction of insertion of the chip-enabled card; and
   a motor that moves the carriage between the protected position and the reading position in response to the detecting that the chip-enabled card is in the fully-inserted position.

7. The card reader of claim 6, wherein the motor moves the carriage between the reading position and the protected position in response to the detecting that the chip-enabled card is in the fully-inserted position.

8. The card reader of claim 6, wherein the smart chip connector has reduced accessibility through the opening when the chassis is in the protected position.

9. The card reader of claim 6, wherein the carriage further comprises a plurality of guides that engage the carriage track.

10. The card reader of claim 6, wherein the card reader further comprises at least one of a printed circuit board and a tamper mesh, wherein the smart chip connector is positioned behind the printed circuit board or the tamper mesh when in the protected position.

11. The card reader of claim 6, wherein the card slot is provided at an angle to a front of the card reader.

12. A chip-enabled card reader, comprising:
    a card slot that receives a chip-enabled card;
    a carriage comprising a smart chip connector that contacts a chip on the chip-enabled card; and
    at least one carriage track disposed within the chassis that slideably engages the carriage and defines a path of movement for the carriage between a protected position and a reading position, wherein the path of movement is in a substantially same direction as a direction of insertion of the chip-enabled card;
    wherein the carriage moves along the path of movement to a reading position, wherein the smart chip connector contacts the chip on the chip-enabled card when the chip-enabled card is in a fully-inserted position; and
    wherein the carriage is in the protected position when no card has been inserted into the card slot.

13. The card reader of claim 12, further comprising:
    at least one biasing element that biases the carriage in the protected position.

14. The card reader of claim 12, wherein the carriage further comprises a latch that engages an edge of the chip-enabled card in the card slot.

15. The card reader of claim 14, wherein the carriage moves along the path of movement in response to the chip-enabled card engaging the latch.

16. The card reader of claim 12, further comprising:
    a motor that moves the carriage between the protected position and the reading position.

17. The card reader of claim 16, wherein the motor moves the carriage in response to the detecting that the chip-enabled card is in the fully-inserted position.

18. The card reader of claim 12, further comprising:
    a bottom guide block and a top guide block, wherein the bottom guide block and a top guide block define the card slot.

19. The card reader of claim 18, wherein the bottom guide block comprises at least one opening for debris to pass through.

20. The card reader of claim 12, wherein the card reader further comprises at least one of a printed circuit board and a tamper mesh, wherein the smart chip connector is positioned behind the printed circuit board or the tamper mesh when in the protected position.

\* \* \* \* \*